United States Patent Office 3,573,324
Patented Mar. 30, 1971

3,573,324
2,3,4,5,10,10a-HEXAHYDROAZEPINO
[2,3-b]INDOLES
Jackson B. Hester, Jr., Portage, Mich., assignor to The
Upjohn Company, Kalamazoo, Mich.
No Drawing. Filed Feb. 28, 1969, Ser. No. 803,479
Int. Cl. C07d 27/36
U.S. Cl. 260—326.5
5 Claims

ABSTRACT OF THE DISCLOSURE

New 2,3,4,5,10,10a-hexahydroazepino[2,3-b]indoles of the formula:

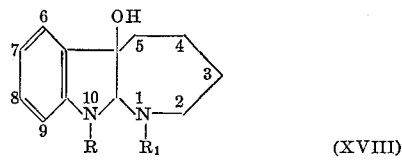

(XVIII)

wherein R is selected from the group consisting of methyl, ethyl and acetyl and wherein $R_1$ is selected from the group consisting of ethyl and acetyl with the proviso that when R is methyl or ethyl, $R_1$ is acetyl, are prepared. These compounds and the pharmacologically acceptable acid addition salts of the amines have sedative action and can be used in mammals and birds as tranquilizers.

BACKGROUND OF THE INVENTION

Field of the invention

The present invention is concerned with new organic compounds and more particularly with novel 2,3,4,5,10, 10a-hexahydroazepino[2,3-b]indoles and their acid addition salts, intermediates and a process of production thereof.

The processes of production for the compounds of the present invention can be illustratively represented as follows:

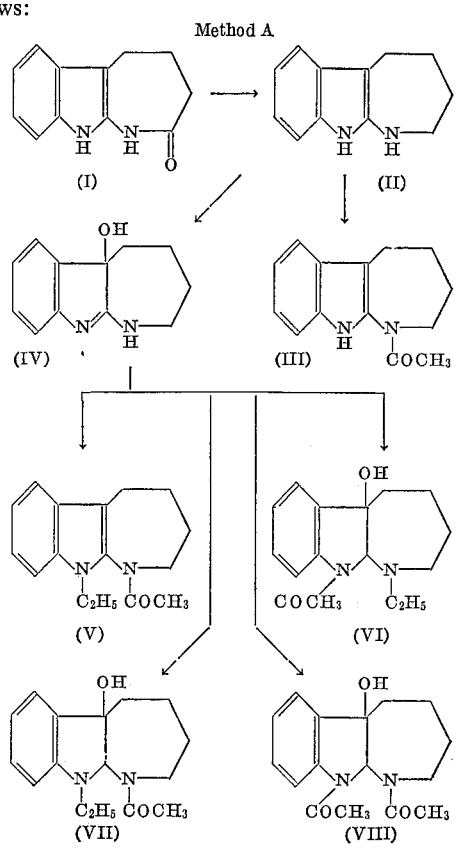

Method B

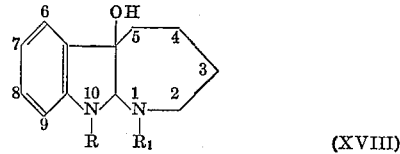

The important products of this invention can be represented by Formula XVIII:

(XVIII)

wherein R is selected from the group consisting of methyl, ethyl and acetyl and wherein $R_1$ is selected from the group consisting of ethyl and acetyl with the proviso that R is methyl or ethyl only, if $R_1$ is acetyl.

Method A of this invention comprises the following steps: reducing 3,4,5,10-tetrahydroazepino[2,3-b]indole-2(1H)-one (1) (Belgian Patent No. 705,424) with lithium hydride to obtain II and treating II with acetic anhydride to give 1-acetyl-1,2,3,4,5,10-hexahydroazepino [2,3-b]indole (III); treating I with lithium aluminum hydride in tetrahydrofuran followed by air oxidation yields 2,3,4,5-tetrahydroazepino[2,3-b]indol-5a-(1H)-ol (IV); treating IV in acetic anhydride in the presence of a palladium-on-charcoal catalyst yielded:

1-acetyl-10-ethyl - 1,2,3,4,5,10 - hexahydroazepino[2,3-b]indole (V);
10-acetyl - 1 - ethyl - 2,3,4,5,10,10a - hexahydroazepino [2,3-b]indol-5a(1H)-ol (VI);

1-acetyl-10-ethyl - 2,3,4,5,10,10a - hexahydroazepino[2,3-b]indol-5a(1H)-ol (VII); and 1,10-diacetyl - 2,3,4,5,10,10a - hexahydroazepino[2,3-b]indol-5a(1H)-ol (VIII).

Method B comprises: treating 3,4-dihydro-9-methylcarbazol-1(2H)-one (IV) (produced from 3,4-dihydrocarbazol-1(2H)-one with methyl sulfate) with a hydroxylamine salt in the presence of a base to obtain the corresponding oxime (X) which is reacted with p-toluenesulfonyl chloride to produce 3,4-dihydro-9-methylcarbazol-1(2H)-one oxime p-toluene-sulfonate XI; compound XI by absorption on water-deactivated neutral alumina is converted to 3,4,5,10-tetrahydro-10-methylazepino-[2,3-b]indol-2(1H)-one (XII); compound XII when reduced with lithium aluminum hydride and after being permitted to stand in air, yielded 3,4,5,10-tetrahydro-10-methylazepino[2,3-b]indol-5a(2H)-ol (XIII), hydrogenating compound XIII in the presence of a palladium-on-charcoal catalyst in acetic anhydride gave:

1-ethyl - 1,2,3,4,5,10 - hexahydro-10-methylazepino[2,3-b]-indole (XIV);

1-acetyl - 1,2,3,4,5,10 - hexahydro-10-methylazepino[2,3-b]-indole (XV);

3,4,5,10-tetrahydro - 10 - methylazepino[2,3-b]indol-5a-(2H)-ol acetate (XVI);

1-acetyl - 2,3,4,5,10,10a - hexahydro-10-methylazepino[2,3-b]indol-5a(1H)-ol (XVII).

DESCRIPTION OF THE PREFERRED EMBODIMENT

The novel compounds of the Formula XVII including acid addition salts of the amino compounds have sedative and tranquilizing effects in mammals and birds.

The acid addition salts of compounds of Formula XVIII contemplated in this invention, are the hydrochlorides, hydrobromides, hydroiodides, sulfates, phosphates, acetates, lactates, tartrates, citrates, salicylates, succinates, malates, maleates, pamoates, cyclohexanesulfamates, methanesulfonate and the like, prepared by reacting a compound of Formula XVIII where R or $R_1$ equals alkyl as defined above with the stoichiometrically calculated amount of the selected pharmacologically acceptable acid.

Sedative effects of 1-ethyl-2,3,4,5,10,10a-hexahydro-10-acetylazepino[2,3-b]indol-5a(2H)-ol is shown by the following tests in mice.

Chimney test [Med: Exp. 4, 11 (1961)]: The effective dosage for 50% of mice $ED_{50}$ is less than 100 mg./kg. The test determines the ability of mice to back up and out of a vertical glass cylinder within 30 seconds. At the effective dosage, 50% of the mice failed doing it. Dish test: Mice in Petri dishes (10 cm. diameter, 5 cm. high, partially embedded in wood shavings) climb out in a very short time, when not treated. Mice remaining in the dish for more than 3 minutes indicates tranquilization. $ED_{50}$ equals the dose of test compound at which 50% of the mice remain in the dish. $ED_{50}$ (intraperitoneal administration) in this test was less than 50 mg./kg. Pedestal test: The untreated mouse leaves the pedestal in less than a minute to climb back to the floor of the standard mouse box. Tranquilized mice will stay more than one minute. $ED_{50}$ (intraperitoneal administration) is less than 100 mg./kg.

Nicotine antagonism test: Mice in groups of 6 were injected with 1-ethyl-2,3,4,5,10,10a-hexahydro-10-acetyl-azepino[2,3-b]indol-5a(1H)-ol. Thirty minutes later the mice including control (untreated) mice are injected with 2 mg./kg. nicotine salicylate. The control mice show overstimulation, i.e., (1) running convulsion followed by (2) tonic extensor fits; followed by (3) death. A dosage of 112 mg./kg. protected 50% of the mice against (2) and (3) ($ED_{50}$).

The pharmaceutical forms contemplated by this invention include pharmaceutical compositions suited for oral, parenteral and rectal use, e.g., ointments, lotions, tablets, oils, powder packets, cachets, dragées, capsules, solutions, suspensions, sterile injectible forms, suppositories, bougies and the like. Suitable diluents or carriers such as carbohydrates (lactose) proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be added.

For mammals and birds food premixes, with starch, oatmeal, dried fishmeat, fishmeal, flour and the like can be prepared.

As tranquilizer the compounds of Formula XVIII can be used in dosages of 5-200 mg./kg. in oral or injectable preparations as described above, to alleviate tension and anxiety in mammals or birds, such as e.g., occurs when animals are in travel.

Other acid addition salts of the amine compounds of Formula XVIII can be made such as the fluosilicic acid addition salts which are useful mothproofing compounds or the trichloroacetates useful as herbicides against Johnson grass, Bermuda grass, yellow foxtail, green foxtail, and quack grasses.

In carrying out the process of the present invention according to Method A, 3,4,5,10-tetrahydroazepino[2,3-b]indol-2(1H)-one (I) was reduced with lithium aluminum hydride in a solvent such as tetrahydrofuran, ether, benzene or mixtures thereof. The lithium aluminum hydride is generally used in a large excess, such as from 2 to 10 times the amount stoichiometrically required. After all of the lithium aluminum hydride has been added, the mixture is refluxed from 2 to 24 hours and decomposed with water and a base such as aqueous sodium hydroxide. After filtration to remove solid particles, the filtrate contains 1,2,3,4,5,10-hexahydroazepino [2,3-b] indole (II) which is acylated without isolation. For this purpose, the filtrate is treated with pyridine and excess acetic anhydride and then concentrated in vacuo to give a residue. This residue is purified by conventional procedures such as recrystallization, extraction or chromatography to give 1-acetyl-1,2,3,4,5,10-hexahydroazepino-[2,3-b]indole (III).

In the same manner, reducing 3,4,5,10-tetrahydro-azepino[2,3-b]indol-2(1H)-one with lithium aluminum hydride, decomposing the reaction mixture and filtering and then stirring the thus-produced compound (II) in air for 1 to 4 days produces 2,3,4,5-tetrahydroazepino [2,3-b]indol-5a(1H)-ol (IV). The thus-produced compound (IV) is isolated and purified in conventional manner, such as evaporating the solvent and crystallizing the product using additional crystallization, chromatography or extraction procedures to obtain the pure product of Formula IV.

Compound IV is hydrogenated in the presence of a palladium-on-carbon catalyst in acetic anhydride suspension. In the preferred embodiment of this invention 2,3,4,5-tetrahydroazepino[2,3-b]indol - 5a(1H) - ol with about half of the amount by weight of 10% palladium-on-carbon catalyst and 25-150 ml. of acetic anhydride per gram is hydrogenated for a period of 4 to 12 hours at 20 to 60 p.s.i. hydrogen pressure. Four products are obtained, namely:

1-acetyl-10-ethyl-1,2,3,4,5,10-hexahydroazepino[2,3-b]indole (V);

10-acetyl-1-ethyl-2,3,4,5,10,10a-hexahydroazepino[2,3-b]indol-5a(1H)-ol (VI);

1-acetyl-10-ethyl-2,3,4,5,10,10a-hexahydroazepino[2,3-b]indol-5a(1H)-ol (VII);

1,10-diacetyl-2,3,4,5,10,10a-hexahydroazepino[2,3-b]indol-5a(1H)-ol (VIII).

These products are separated from each other by chromatography, using ethyl acetate and Skellysolve B hexanes as eluents.

In carrying out the process of Method B, 3,4-dihydro-9-methylcarbazol-1(2H)-one (IX) is refluxed with hydroxylamine hydrochloride and anhydrous sodium acetate, water and ethanol for a period between 12 to 24 hours. After the reaction is terminated and the reaction mixture cooled, crystalline 3,4-dihydro-9-methylcarbazol-1(2H)-one oxime (X) precipitates in the mixture and can be recovered by filtration. The thus-obtained oxime (X) is treated with p-toluenesulfonyl chloride in pyridine. The mixture after standing for 1 to 6 days is poured into water and the product 3,4-dihydro-9-methylcarbazol-1(2H)-one oxime p-toluenesulfonate (XI), is recovered by filtration and may be purified by conventional procedures such as chromatography and recrystallization.

The thus-obtained toluenesulfonate of Formula XI is treated wtih neutral alumina in the presence of a small amount of water, 0.2 to 0.5% by weight of the alumina, and the product is obtained by extraction from the reaction mixture contained in a column. The product 3,4,5,10-tetrahydro - 10 - methylazepino[2,3-b]indol - 2(1H)-one (XII) by treatment with lithium aluminum hydride and subsequent exposure to air is converted to 3,4,5,10-tetrahydro-10-methylazepino[2,3-b]indol-5a(2H)-ol (XIII) in the same manner as given above.

Hydrogenating this product (XIII) in the presence of a 10% palladium-on-carbon catalyst and in a solution or mixture of acetic anhydride produces pure products which are separated by chromatography and are:

1-ethyl-1,2,3,4,5-hexahydro-10-methylazepino[2,3-b] indole (XIV) as the hydrochloride;
1-acetyl-1,2,3,4,5,10-hexahydro-10-methylazepino[2,3-b] indole (XV);
3,4,5,10-tetrahydro-10-methylazepino[2,3-b]indol-5a(2H)-ol acetate (XVI);
1-acetyl-2,3,4,5,10,10a-hexahydro-10-methylazepino[2,3-b]indol-5a(1H)-ol (XVIII).

The following examples are illustrative of the process and products of the present invention, but are not to be construed as limiting.

EXAMPLE 1

1-acetyl-1,2,3,4,5,10-hexahydroazepino[2,3-b]indole 3,4,5,10 - tetrahydroazepino[2,3-b]indol - 2(1H) - one (5.05 g., 0.0252 mole) was added under nitrogen to an ice cold, stirred suspension of lithium aluminum hydride (5.0 g.) in tetrahydrofuran (350 ml.). The resulting mixture was refluxed for 18 hours, cooled in an ice bath and treated successively with water (5 ml.), 15% aqueous sodium hydroxide (5 ml.) and water (15 ml.). This mixture was stirred under nitrogen for 1 hour and filtered. The filtrate was treated with pyridine (100 ml.) and acetic anhydride (10 ml.) and concentrated to a volume of 100 ml. in vacuo. This solution was treated with additional acetic anhydride (10 ml.), kept under nitrogen at ambient temperature for 18 hours and concentrated in vacuo to give a residue. The residue was stirred with water for several hours, and the resulting crystalline product was collected by filtration, washed with water, dried and recrystallized from ethyl acetate to give 1.55 g. (26.9%) of 1 - acetyl - 1,2,3,4,5,10 - hexahydroazepino [2,3-b]indole of melting point 194.5–196.5° C. A small second crop, 0.121 g. of melting point 193.5–194.5° C., was obtained by concentrating the mother liquor. The analytical sample of melting point 193° C., was prepared by recrystallizing some of this material from ethyl acetate.

U.V.: $\lambda_{max}$. 223, 285 and 289.5 m$\mu$ ($\epsilon$ 37,050, 8800 and 8400 respectively) with an inflection at 275 m$\mu$ ($\epsilon$ 9350).

*Analysis.*—Calcd. for $C_{14}H_{16}N_2O$ (percent): C, 73.65; H, 7.06; N, 12.27. Found (percent): C, 73.39; H, 7.14; N, 12.37.

EXAMPLE 2

2,3,4,5-tetrahydroazepino[2,3-b]indol-5a(1H)-ol, its hydrochloride and hydrobromide 3,4,5,10 - tetrahydroazepino[2,3-b]indol - 2(1H) - one (12.7 g., 0.0634 mole) was added, under nitrogen, to an ice cold, stirred suspension of lithium aluminum hydride (13 g.) in tetrahydrofuran (1300 ml.). The resulting mixture was refluxed for 15 hours, cooled in an ice bath and treated successively with water (13 ml.), 15% aqueous sodium hydroxide solution (13 ml.) and water (39 ml.). This mixture was stirred for a few minutes and filtered. The filtrate was concentrated in vacuo to give a residue. A solution of the residue in methanol was stored at 0° C. for 2 days and crystallized to give 4.80 g. of melting point 252.5–253.5° C. (dec.); 2.99 g. of melting point 248.5–250° C. (dec.) and 1.30 g. of melting point 247–248.5° C. (dec.) (70.8% yield) of 2,3,4,5-tetrahydroazepino[2,3-b]indol - 5a(1H) - ol. The analytical sample of melting point 255–259.5° C., was prepared by recrystallizing this material from methanol.

U.V.: $\lambda_{max}$. 223, 280, 290, and 319 m$\mu$ ($\epsilon$ 23,060; 10,030; 9270; and 4300 respectively).

*Analysis.*—Calcd. for $C_{12}H_{14}N_2O$ (percent): C, 71.26; H, 6.98; N, 13.85. Found (percent): C, 70.82; H, 6.99; N, 13.64.

A solution of 2,3,4,5 - tetrahydroazepino[2,3-b]indol-5a(1H)-ol in methanol was acidified with methanolic hydrogen chloride and the resulting salt was crystallized from methanol to give 2,3,4,5-tetrahydroazepino[2,3-b] indol-5a(1H)-ol hydrochloride of melting point 229.5–230.5° C. (dec.).

U.V.: $\lambda_{max}$. 221, 224, 269, 278 and 299 m$\mu$ ($\epsilon$ 19,650; 19,700; 5700; 5550 and 4200 respectively) with an inflection at 293 m$\mu$ ($\epsilon$ 4150).

*Analysis.*—Calcd. for $C_{12}H_{15}ClN_2O$ (percent): C, 60.37; H, 6.33; Cl, 14.86; N, 11.74. Found (percent): C, 60.44; H, 6.63; Cl, 15.00; N, 11.52.

A solution of 2,3,4,5 - tetrahydroazepino[2,3-b]indol-5a(1H)-ol in methanol was acidified with methanolic hydrogen bromide and the resulting salt was crystallized from methanol-ethyl acetate to give 2,3,4,5 - tetrahydroazepino[2,3-b]indol-5(1H)-ol hydrobromide of melting point 205.5–206.5° C. (dec.).

U.V.: $\lambda_{max}$. 219, 268, 278 and 290.5 m$\mu$ ($\epsilon$ 19,500; 5660; 5800 and 4360 respectively) with inflections at 223 and 300 m$\mu$ ($\epsilon$ 19,800 and 2560 respectively).

*Analysis.*—Calcd. for $C_{12}H_{15}BrN_2O$ (percent): C, 50.89; H, 5.34; Br, 28.22; N, 9.90. Found (percent): C, 50.82; H, 5.47; Br, 28.23; N, 10.14.

EXAMPLE 3

1 - acetyl - 10 - ethyl - 1,2,3,4,5,10 - hexahydroazepino [2,3-b]indole; 10 - acetyl - 1 - ethyl - 2,3,4,5,10,10a-hexahydroazepino[2,3-b]indol - 5a(1H) - ol; 1 - acetyl-10 - ethyl - 2,3,4,5,10,10a - hexahydroazepino[2,3-b] indol - 5a(1H) - ol; 1,10 - diacetyl - 2,3,4,5,10,10a-hexahydroazepino[2,3-b]indol-5a(1H)-ol A mixture of 2,3,4,5 - tetrahydroazepino[2,3-b]indol-5a(1H)-ol (7.00 g., 0.0346 mole), 10% palladium-on-carbon (3.5 g.) and acetic anhydride (700 ml.) was hydrogenated at an initial pressure of 30 p.s.i. for 8 hours and allowed to stand under hydrogen for an additional 16 hours. It was then filtered through Celite diatomaceous earth and the filtrate was concentrated in vacuo to give a residue. A solution of the residue in xylene was concentrated in vacuo to remove last traces of acetic anhydride and the residual oil was chromatographed on silica gel (400 g.); 70 ml. fractions were collected. Fractions 1–120 were eluted with 30% ethyl acetate-70% Skellysolve B hexanes and 121–240 were eluted with ethyl acetate. The first compound was eluted in fractions 34–50 and was crystallized from ethyl acetate-Skellysolve B hexanes to give 0.658 g. of melting point 141–142.5° C.; 0.183 g. of melting point 140–142° C. and 0.053 g. of melting point 138.5–140.5° C. (10.8% yield) of 1-acetyl-10 - ethyl - 1,2,3,4,5,10 - hexahydroazepino[2,3-b]indole. The analytical sample of melting point 140.5–141.5° C., was prepared by recrystallizing some of this material from ethyl acetate-Skellysolve B hexanes.

U.V.: $\lambda_{max}$. 226, 284 and 293 m$\mu$ ($\epsilon$ 39,750; 9230 and 7870 respectively) with an inflection at 278 m$\mu$ ($\epsilon$ 8520).

Analysis.—Calcd. for $C_{16}H_{20}N_2O$ (percent): C, 74.96; H, 7.86. Found (percent): C, 74.89; H, 7.83.

The second compound was eluted in fractions 58–88 and was crystallized from ethyl acetate-Skellysolve B hexanes to give 2.30 g. of melting point 162.5–164° C., and 0.185 g. of melting point 161.5–162.5° C. (26.2% yield) of 10 - acetyl - 1 - ethyl - 2,3,4,5,10,10a - hexahydroazepino[2,3-b]indol - 5a(1H) - ol. The analytical sample of melting point 164–165° C., was prepared by recrystallizing some of this material from ethyl acetate.

U.V.: $\lambda_{max}$. 248 m$\mu$ ($\epsilon$ 13,900) and inflections at 278 and 286 m$\mu$ ($\epsilon$ 2460 and 1685 respectively).

Analysis.—Calcd. for $C_{16}H_{22}N_2O_2$ (percent): C, 70.04; H, 8.08; N, 10.21. Found (percent): C, 69.98; H, 8.21; N, 10.19.

The third compound was eluted from the column in fractions 152–164 and crystallized from ethyl acetate-Skellysolve B hexanes to give 0.261 g. of melting point 124–125° C., and 0.094 g. of melting point 117.5–119° C. (3.74%) of 1-acetyl-10-ethyl-2,3,4,5,10,10a-hexahydroazepino[2,3-b]indol-5a(1H)-ol. The analytical sample of melting point 111.5–112.5° C. was prepared by recrystallizing this material from ethyl acetate-Skellysolve B hexanes.

U.V.: $\lambda_{max}$.. 208, 251 and 309 m$\mu$ ($\epsilon$ 34,200; 13,840 and 2670 respectively).

Analysis.—Calcd. for $C_{16}H_{22}N_2O_2$ (percent): C, 70.04; H, 8.08; N, 10.21. Found (percent): C, 70.12; H, 8.22; N, 10.31.

The fourth compound was eluted in fractions 176–240 and was crystallized from methanol-ethyl acetate to give 2.58 g. (25.8%) of 1,10-diacetyl-2,3,4,5,10,10a-hexahydroazepino[2,3-b]indol-5a(1H)-ol of melting point 199–201° C. The analytical sample of melting point 200–201° C. was prepared by recrystallizing some of this material from methanol-ethyl acetate.

U.V.: $\lambda_{max}$. 246, 278 and 287 m$\mu$ ($\epsilon$ 14,150; 2040 and 1600 respectively).

Analysis.—Calcd. for $C_{16}H_{20}N_2O_3$ (percent): C, 66.64; H, 6.99; N, 9.72. Found (percent): C, 66.31; H, 6.96; N, 9.55.

EXAMPLE 4

3,4-dihydro-9-methylcarbazol-1(2H)-one oxime

A mixture of 3,4-dihydro-9-methylcarbazol-1(2H)-one (112.2 g., 0.563 mole), hydroxylamine hydrochloride (59.4 g.), anhydrous sodium acetate (76.6 g.), water (510 ml.) and ethanol (2100 ml.) was refluxed under nitrogen for 18 hours and was cooled in an ice bath. The resulting crystalline product was collected by filtration, washed with water and dried to give 106.3 g. (87.9%) of 3,4-dihydro - 9 - methylcarbazol-1(2H)-one oxime of melting point 183–185° C.

EXAMPLE 5

3,4-dihydro-9-methylcarbazol-1(2H)-one oxime p-toluenesulfonate

A solution of 3,4-dihydro-9-methylcarbazol-1(2H)-one oxime (112.2 g., 0.524 mole) and p-toluenesulfonyl chloride (198 g., 1.05 mole) in pyridine (6 l.) was prepared at 0° C., stored under nitrogen at ambient temperatures in the dark for 98 hours and poured into ice water (12 l.). This mixture was stirred for about 1 hour and the resulting crystalline product was collected by filtration, washed with water, dried and recrystallized from ethyl acetate-Skellysolve B hexanes to give 161.8 g. (84.1%) of 3,4-dihydro-9-methylcarbazol-1(2H)-one oxime p-toluenesulfonate of melting point 119.5–121.5° C. The analytical sample of melting point 120–121° C. was prepared by recrystallizing some of this material from ethyl acetate-Skellysolve B hexanes.

U.V.: $\lambda_{max}$. 207, 226 and 310 m$\mu$ ($\epsilon$ 29,600; 26,350 and 26,050 respectively) and inflections at 243, 274 and 345 m$\mu$ ($\epsilon$ 16,700; 3450 and 6500 respectively).

Analysis.—Calcd. for $C_{20}H_{20}N_2O_3S$ (percent): C, 65.19; H, 5.47; N, 7.60; S, 8.70. Found (percent): C, 65.15; H, 5.39; N, 7.64; S, 8.53.

EXAMPLE 6

3,4,5,10-tetrahydro-10-methylazepino[2,3-b]indol-2(1H)-one

A solution of 3,4-dihydro-9-methylcarbazol-1(2H)-one oxime p-toluenesulfonate (153.7 g., 0.417 mole) in benzene (1.5 l.) was absorbed on a column of neutral alumina (15 kg.) which had been deactivated with 0.4% water. The column was developed with 32 l. of benzene and eluted with 10 l. of chloroform followed by 25 l. of 20% methanol-80% chloroform. The combined product was chromatographed on silica gel (4.5 kg.) with 60% ethyl acetate-40% cyclohexane. The product obtained from this column was dissolved in methanol-ethyl acetate, decolorized with Darco G–60 activated charcoal and crystallized from ethyl acetate to give 20.6 g. (23.1%) of 3,4,5,10 - tetrahydro - 10 - methylazepino[2,3-b]indol-2(1H)-one, of melting point 189–191° C. The analytical sample of melting point 193–194.5° C. was prepared by recrystallizing some of this material from ethyl acetate.

U.V.: $\lambda_{max}$. 232 and 297 m$\mu$ ($\epsilon$ 30,500 and 13,800 respectively) with inflections at 211 and 292 m$\mu$ ($\epsilon$ 29,250 and 12,700 respectively).

Analysis.—Calcd. for $C_{13}H_{14}N_2O$ (percent): C, 72.87; H, 6.59; N, 13.08. Found (percent): C, 72.89; H, 6.58; N, 13.22.

EXAMPLE 7

3,4,5,10-tetrahydro-10-methylazepino[2,3-b]indol-5a(2H)-ol hydrochloride 3,4,5,10 - tetrahydro - 10 - methylazepino[2,3-b]indol-2(1H)-one (17.7 g., 0.0824 mole) was added, under nitrogen, to an ice cold, stirred suspension of lithium aluminum hydride (18 g.) in tetrahydrofuran. The resulting mixture was refluxed for 18 hours, cooled in an ice bath and treated successively with water (18 ml.), 15% aqueous sodium hydroxide (18 ml.) and water (54 ml). This mixture was stirred for 1.5 hours and filtered. The filtrate was concentrated under reduced pressure. An ethyl acetate solution of the residue was allowed to stand at ambient temperature for 3 hours and was then cooled in an ice bath and acidified with methanolic hydrogen chloride giving a precipitate. The precipitate was collected by filtration and dried to give 14.7 g. (70.6%) of 3,4,5,10-tetrahydro-10-methylazepino[2,3-b]indol - 5a(2H)-ol hydrochloride of melting point 268–269° C. The analytical sample of melting point 264.5–265° C., was prepared by recrystallizing some of this material from methanol-ethyl acetate.

U.V.: $\lambda_{max}$. 219, 271, 278 and 296 m$\mu$ ($\epsilon$ 20,550; 5930; 5810 and 4120 respectively) with an inflection at 222 m$\mu$ ($\epsilon$ 20,000).

Analysis.—Calcd. for $C_{13}H_{17}ClN_2O$ (percent): C, 61.77; H, 6.78; Cl, 14.03; N, 11.09. Found (percent): C, 61.69; H, 6.91; Cl, 14.05; N, 11.12; $H_2O<0.1$.

EXAMPLE 8

Hydrogenation of 3,4,5,10-tetrahydro - 10 - methylazepino[2,3-b]indol - 5a(2H) - ol in acetic anhydride with palladium.

A solution of 3,4,5,10-tetrahydro - 10 - methylazepino[2,3-b]indol - 5a(2H) - ol hydrochloride in water was cooled in an ice-bath, made alkaline with sodium hydroxide and extracted with ether. The extract was washed with brine, dried over anhydrous potassium carbonate and concentrated in vacuo. The residue was crystallized from ethyl acetate to give 3,4,5,10-tetrahydro - 10 - methylazepino[2,3-b]indol - 5a(2H) - ol of melting point 129–133° C. (If necessary, this material may be purified by chromatography on silica gel with 2% triethylamine-2.5% methanol-95.5% ethyl acetate.)

U.V.: $\lambda_{max.}$ 217 and 277 m$\mu$ ($\epsilon$ 24,050 and 13,650 respectively) with an inflection at 302 m$\mu$ ($\epsilon$ 2700).

Analysis.—Calcd. for $C_{13}H_{16}N_2O$ (percent): C, 72.19; H, 7.46; N, 12.95. Found (percent): C, 71.83; H, 7.78; N, 12.75.

A mixture of 3,4,5,10 - tetrahydro - 10 - methylazepino[2,3-b]indol - 5a(2H) - ol (5.00 g., 0.0231 mole), 10% palladium-on-carbon catalyst (2.5 g.) and acetic anhydride (500 ml.) was hydrogenated at an initial pressure of 30 p.s.i. for 8 hours and allowed to stand under hydrogen without shaking for an additional 16 hours. The catalyst was removed by filtration through Celite diatomaceous earth; the solid was washed with ethyl acetate and the combined filtrate was concentrated in vacuo. The residue was dissolved in xylene and concentrated to remove last traces of acetic anhydride. This residue was chromatographed on silica gel (250 g.); 50 ml. fractions were collected. Fractions 1–13 were eluted with 30% ethyl acetate-70% cyclohexane and fractions 14–72 with ethyl acetate.

The first compound was eluted in fractions 5–7. A solution of this material in ethyl acetate was acidified with methanolic hydrogen chloride and the salt was crystallized from ethanol-ethyl acetate to give 1.12 g. of melting point 211–212° C. (dec.) and 0.344 g. of melting point 207.5–208.5° C. (23.9% yield) of 1-ethyl-1,2,3,4,5,10 - hexahydro - 10 - methylazepino[2,3-b]indole hydrochloride. The analytical sample of melting point 209–210° C. (dec.) was prepared by recrystallizing this material from ethanol-ethyl acetate.

U.V.: $\lambda_{max.}$ 219, 276 and 283 m$\mu$ ($\epsilon$ 17,700; 8550 and 8700 respectively) with an inflection at 293 m$\mu$ ($\epsilon$ 7650).

Analysis.—Calcd. for $C_{15}H_{21}ClN_2$ (percent): C, 68.03; H, 7.99; Cl, 13.39; N, 10.58. Found (percent): C, 67.73; H, 7.89; Cl, 13.46; N, 10.10.

A 0.5 g. sample of the hydrochloride was treated with sodium carbonate in water until the reaction mixture was basic. The mixture was then extracted with methylene chloride, the methylene chloride extracts evaporated to give the free base, 1-ethyl - 1,2,3,4,5,10 - hexahydro-10-methylazepino[2,3-b]indole.

The second compound was eluted from the column in fractions 12–15 and was crystallized from ethyl acetate-Skellysolve B hexanes to give 1.43 g. (25.4%) of 1-acetyl - 1,2,3,4,5,10 - hexahydro - 10 - methylazepino-[2,3-b]indole of melting point 130–132.5° C. The analytical sample of melting point 125–125.5° C. was prepared by recrystallizing some of this material from ethanol-Skellysolve B hexanes.

U.V.: $\lambda_{max.}$ 226, 285 and 293 m$\mu$ ($\epsilon$ 40,000; 9290 and 8100 respectively) with an inflection at 279 ($\epsilon$ 8560).

Analysis.—Calcd. for $C_{15}H_{18}N_2O$ (percent): C, 74.35; H, 7.49; N, 11.56. Found (percent): C, 74.60; H, 7.54; N, 11.48.

Further elution of the column (fractions 35–63) gave two additional compounds which were poorly separated. This material was thus combined and rechromatographed on silica gel (150 g.) with 2% triethylamine-23% cyclohexane-75% ethyl acetate. The first compound eluted from this column was crystallized from ethyl acetate-Skellysolve B hexanes to give 0.408 g. (6.87%) of 3,4,5,10-tetrahydro - 10 - methylazepino[2,3-b]indol - 5a(2H) - ol acetate ester of melting point 108.5–110° C. The analytical sample of melting point 105–108° C. was prepared by recrystallizing some of this material from ethyl acetate-Skellysolve B hexanes.

U.V.: $\lambda_{max.}$ 217, 277 and 311 m$\mu$ ($\epsilon$ 23,430; 15,070 and 2450 respectively).

Analysis.—Calcd. for $C_{15}H_{18}N_2O_2$ (percent): C, 69.74; H, 7.02; N, 10.85. Found (percent): C, 69.61; H, 7.04; N, 10.36.

The second compound eluted from the column was crystallized from ethyl acetate-Skellysolve B hexanes after decolorization with active charcoal to give 0.169 g. (2.81%) of 1-acetyl - 2,3,4,5,10,10a - hexahydro - 10-methylazepino[2,3-b]indol - 5a(1H) - ol of melting point 139–141° C. The analytical sample of melting point 141.5–142.5° C. was prepared by recrystallizing this material from ethyl acetate-Skellysolve B hexanes.

U.V.: $\lambda_{max.}$ 250 and 306 m$\mu$ ($\epsilon$ 12,950 and 2625 respectively).

Analysis.—Calcd. for $C_{15}H_{20}N_2O_2$ (percent): C, 69.20; H, 7.74; N, 10.76. Found (percent): C, 68.96; H, 7.86; N, 10.71.

What is claimed is:

1. A compound of the formula

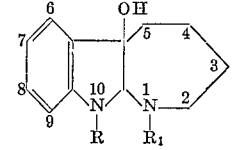

(XVIII)

wherein R is selected from the group consisting of methyl, ethyl, and acetyl and wherein $R_1$ is selected from the group consisting of ethyl and acetyl with the proviso that when R is methyl or ethyl, $R_1$ is acetyl, and the pharmacologically acceptable acid addition salts thereof.

2. The compound of claim 1 wherein R is acetyl and $R_1$ is ethyl and which is therefore 1-ethyl-2,3,4,5,10,10a-hexahydro-10-acetylazepino[2,3-b]indol-5a(1H)-ol.

3. The compound of claim 1 wherein R is ethyl and $R_1$ is acetyl and which is therefore 1-acetyl - 10 - ethyl-2,3,4,5-10,10a - hexahydroazepino[2,3-b]indol - 5a(1H)-ol.

4. The compound of claim 1 wherein R and $R_1$ are acetyl and the compound is therefore 1,10 - diacetyl-2,3,4,5,10,10a - hexahydroazepino[2,3-b]indol - 5a(1H)-ol.

5. The compound of claim 1 wherein R is methyl and $R_1$ is acetyl and which is therefore 1-acetyl-10-methyl-2,3,4,5,10,10a-hexahydoazepino[2,3-b]indol - 5a(1H)-ol.

References Cited

UNITED STATES PATENTS 3,419,569   12/1968   Renne.

ALEX MAZEL, Primary Examiner

J. A. NARCAVAGE, Assistant Examiner

U.S. Cl. X.R.

71—95; 260—326.3, 326.9; 424—274

UNITED STATES PATENT OFFICE
CERTIFICATE OF CORRECTION

Patent No. 3,573,324                     Dated March 30, 1971

Inventor(s) Jackson B. Hester, Jr.

It is certified that error appears in the above-identified patent and that said Letters Patent are hereby corrected as shown below:

Column 3, line 6, for "(IV)" read -- (IX) --; line 31, f "XVII" read -- XVIII --; line 47, for "Med:" read -- [Med. -- line 75, for "ointments" read -- ointment --. Column 8, line for "C, 72,87;" read -- C, 72.87; --. Column 10, lines 54-55 for "ol.   ol." read -- ol. --.

Signed and sealed this 14th day of December 1971.

(SEAL)
Attest:

EDWARD M. FLETCHER, JR.                ROBERT GOTTSCHALK
Attesting Officer                      Acting Commissioner of Pat